UNITED STATES PATENT OFFICE.

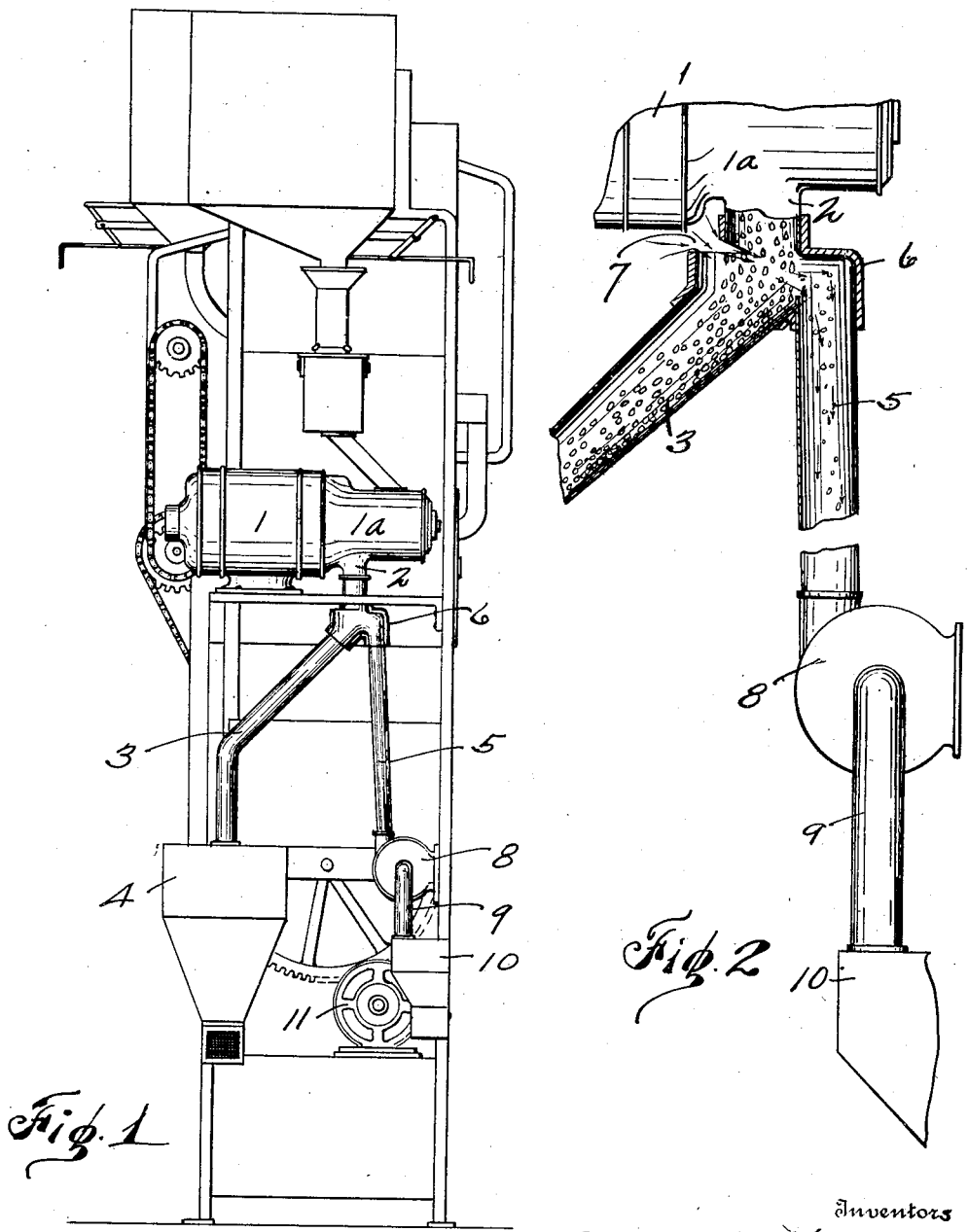

FREDERICK A. WILCOX AND EDWARD L. McGRORY, OF SPOKANE, WASHINGTON.

COFFEE-GRINDING MACHINE.

1,347,608.  Specification of Letters Patent.  Patented July 27, 1920.

Application filed August 5, 1919. Serial No. 315,382.

*To all whom it may concern:*

Be it known that we, FREDERICK A. WILCOX and EDWARD L. McGRORY, citizens of the United States, residing at Spokane, in Spokane county, State of Washington, have invented certain new and useful Improvements in Coffee-Grinding Machines, of which the following is a specification.

Our present invention relates to an improved coffee grinding mill and is designed particularly for use in connection with coffee grinding machines for separating and conveying away the chaff, dust, &c., arising in the mill casing during the grinding operation.

In many machines for this purpose and of this character, the dust, chaff, &c., created during the grinding, arises and settles or sticks to the upper walls of the inclosing casing of the grinding devices, and frequently, after accumulation, cakes or lumps of the dust, chaff, &c., fall back into the coffee being ground. It has been proposed to utilize a suction of air to lift the chaff and dust that forms the mass and falls in lumps, but the heavy draft necessary to lift the lumps also carries away a considerable proportion of the finely ground coffee, thus creating a waste. The purpose of our invention is to so locate the inlet port for the suction of air with relation to the casing of the grinding mill, that we are enabled to utilize a light draft to carry off the chaff and dust that has not sufficient strength to draw away the coffee, and the location of, and utilization of the devices for this purpose, also prevents the accumulation of dust and chaff in the grinding mill casing, as will be described.

In the accompanying drawings we have utilized our invention in connection with a coffee roasting and grinding machine, as forming one of the devices of this combined machine, which enhances the value of the machine from a commercial standpoint, and also improves the quality of the coffee treated in the machine as a whole.

Figure 1 is a view in elevation illustrating the coffee treating machine of which the invention of this application forms a part, the grinding mill being illustrated in operative position and relation to the remainder of the machine.

Fig. 2 is an enlarged, broken, detail view of the features forming the subject matter of the present invention, separated from the machine of which they form a unit.

The coffee treating machine depicted in Fig. 1 embodies instrumentalities for treating, in successive steps, the coffee, one of which steps involves the process of grinding, and the grinders (or grinding mill) of rotary type are inclosed within the cylindrical casing 1 of the mill, having the usual reduced extension $1^a$ as illustrated, and from the extension the outlet pipe 2 leads, downwardly from beneath the mill, and the ground coffee is conveyed, as usual through the chute 3 to the receptacle 4 for the finished product, and then the coffee is disposed of in desired manner.

The coffee passing through the chute 3 to the storage bin or box 4 is pure and free from dust or chaff, these objectionable and extraneous matters being taken care of and passed through the waste pipe 5 forming another leg of the chute that is connected to the coupling or casing 6 forming the joint for these diverging members. The casing 6 thus forms the joint for the three elements— outlet pipe 2, and the two distributing pipes or chutes 3 and 5 through which the material from the grinding mill passes, the coffee by gravity and the waste by suction of air. For creating the suction, the casing 6 is fashioned with an inlet port 7 at one side thereof beneath the mill casing 1 and above the fork of the two distributing pipes or chutes 3 and 5, and this port is on the side of the casing opposite the connection thereto of the waste pipe 5. Suction through the waste pipe is created by a fan 8, and through the pipe 9 the waste material is conveyed to the storage bin 10. By this arrangement of parts the air is taken in through the port around the mouth of the discharge or outlet from the mill, and a draft or suction is created sufficient to prevent the dust and chaff rising in the casing 1, but of sufficient force to draw the dust and chaff through the discharge 2 of the mill. The suction, however, is not sufficient to divert the ground coffee which flows or falls directly into the chute 3, which, it will be observed is a direct, vertical continuation of the discharge pipe 2, being located in a line beneath the discharge outlet. The distributing leg 5 is offset from the discharge outlet and consequently the dust and chaff are drawn in lateral currents from the separating casing 6 before passing into the pipe 5, and the light flow of air, downward and away from the coffee in the pipe 3 carries away the dust and chaff leaving a clean product to pass to the coffee bin 4.

What we claim is—

1. The combination with a mill as described, including its outlet pipe and a joint member secured thereto forming a separating casing, of a conveyer pipe connected to the joint member with its upper open end in alinement with and directly beneath the outlet pipe, a suction pipe secured to the joint member and having a lateral connection with the casing, and said casing having an air inlet port opposite the lateral connection.

2. The combination in a coffee grinding mill with its outlet pipe and a joint member secured thereto forming a separating casing, of a gravity conveyer pipe for coffee connected to the joint member and forming a downwardly and alined continuation of the outlet pipe, a suction pipe having a lateral connection to the joint member, and said casing having an air inlet port between the lower open end of the outlet pipe and the upper open ends of the conveyer and suction pipes.

3. The combination with the mill casing and its discharge pipe, of a separating casing connected thereto and fashioned with a lateral inlet port, of an inclined gravity conveyer pipe connected to the separating casing directly beneath and in line with said discharge pipe, a suction pipe offset from the discharge pipe and having lateral connection to the separating casing opposite the inlet port, a suction fan, and a storage receptacle for the chaff, as described.

In testimony whereof we affix our signatures.

FREDERICK A. WILCOX.
EDWARD L. McGRORY.